United States Patent
Morioka et al.

(10) Patent No.: US 8,980,399 B2
(45) Date of Patent: Mar. 17, 2015

(54) PRESSURE-SENSITIVE ADHESIVE SHEET

(75) Inventors: Takashi Morioka, Tokyo (JP); Naoki Taya, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 13/581,859

(22) PCT Filed: Feb. 24, 2011

(86) PCT No.: PCT/JP2011/054190
§ 371 (c)(1),
(2), (4) Date: Oct. 1, 2012

(87) PCT Pub. No.: WO2011/108442
PCT Pub. Date: Sep. 9, 2011

(65) Prior Publication Data
US 2013/0017363 A1      Jan. 17, 2013

(30) Foreign Application Priority Data
Mar. 4, 2010    (JP) ................. 2010-047367

(51) Int. Cl.
*B32B 3/24*      (2006.01)
*C09J 7/02*      (2006.01)

(52) U.S. Cl.
CPC ............ *C09J 7/0267* (2013.01); *C09J 2201/20* (2013.01); *C09J 2423/006* (2013.01); *C09J 2425/006* (2013.01); *C09J 2433/006* (2013.01); *C09J 2205/31* (2013.01)
USPC ........................... 428/137; 428/40.1; 428/343

(58) Field of Classification Search
USPC ......................... 428/137, 40.1, 343
See application file for complete search history.

(56) References Cited

U.S. PATENT DOCUMENTS

| 7,005,603 B2 * | 2/2006 | Addington et al. ...... 219/121.69 |
| 2006/0222813 A1 | 10/2006 | Kato et al. |
| 2008/0032118 A1 | 2/2008 | Kato et al. |
| 2008/0090049 A1 | 4/2008 | Kato et al. |

(Continued)

FOREIGN PATENT DOCUMENTS

| CN | 1973012 A | 5/2007 |
| JP | 08-003330 A | 1/1996 |

(Continued)

OTHER PUBLICATIONS

International Search Report mailed on Apr. 19, 2011 for the corresponding International patent application No. PCT/JP2011/054190.

(Continued)

*Primary Examiner* — William P Watkins, III
(74) *Attorney, Agent, or Firm* — Posz Law Group, PLC

(57) ABSTRACT

A pressure-sensitive adhesive sheet includes a base material and a pressure-sensitive adhesive layer and is formed therein with a plurality of through-holes passing through from one surface to the other surface, wherein the base material comprises a resin composition, and the resin composition contains: 50 to 88 wt % of a polyolefin-based resin (A); 10 to 48 wt % of a styrene-based resin and/or an acrylic-based resin (B) excluding the polyolefin-based resin (A); and 2.0 to 30 wt % of a pigment (C). According to such pressure-sensitive adhesive sheet, air entrapments and blisters can be prevented or removed via the through-holes and the inner diameter of the through-holes is suppressed from expanding, and thereby the pressure-sensitive adhesive sheet has a good appearance.

18 Claims, 2 Drawing Sheets

(56) References Cited

U.S. PATENT DOCUMENTS

| | | |
|---|---|---|
| 2010/0032088 A1 | 2/2010 | Kato et al. |
| 2010/0209671 A1 | 8/2010 | Kato |

FOREIGN PATENT DOCUMENTS

| | | |
|---|---|---|
| JP | 10-140103 A | 5/1998 |
| JP | 2002-113819 A | 4/2002 |
| JP | 2002-344144 A | 11/2002 |
| JP | 2003-064323 A | 3/2003 |
| JP | 2006-001951 A | 1/2006 |
| JP | 2007-075858 A | 3/2007 |
| JP | 2007-099908 A | 4/2007 |
| JP | 2009-062454 A | 3/2009 |
| JP | 2009-096816 A | 5/2009 |
| WO | WO 2004/061032 A1 | 7/2004 |
| WO | WO 2005/121268 A1 | 12/2005 |
| WO | WO 2010/100978 A1 | 9/2010 |

OTHER PUBLICATIONS

Office Action dated May 20, 2013 for corresponding Chinese patent application 201180012274.7.

* cited by examiner

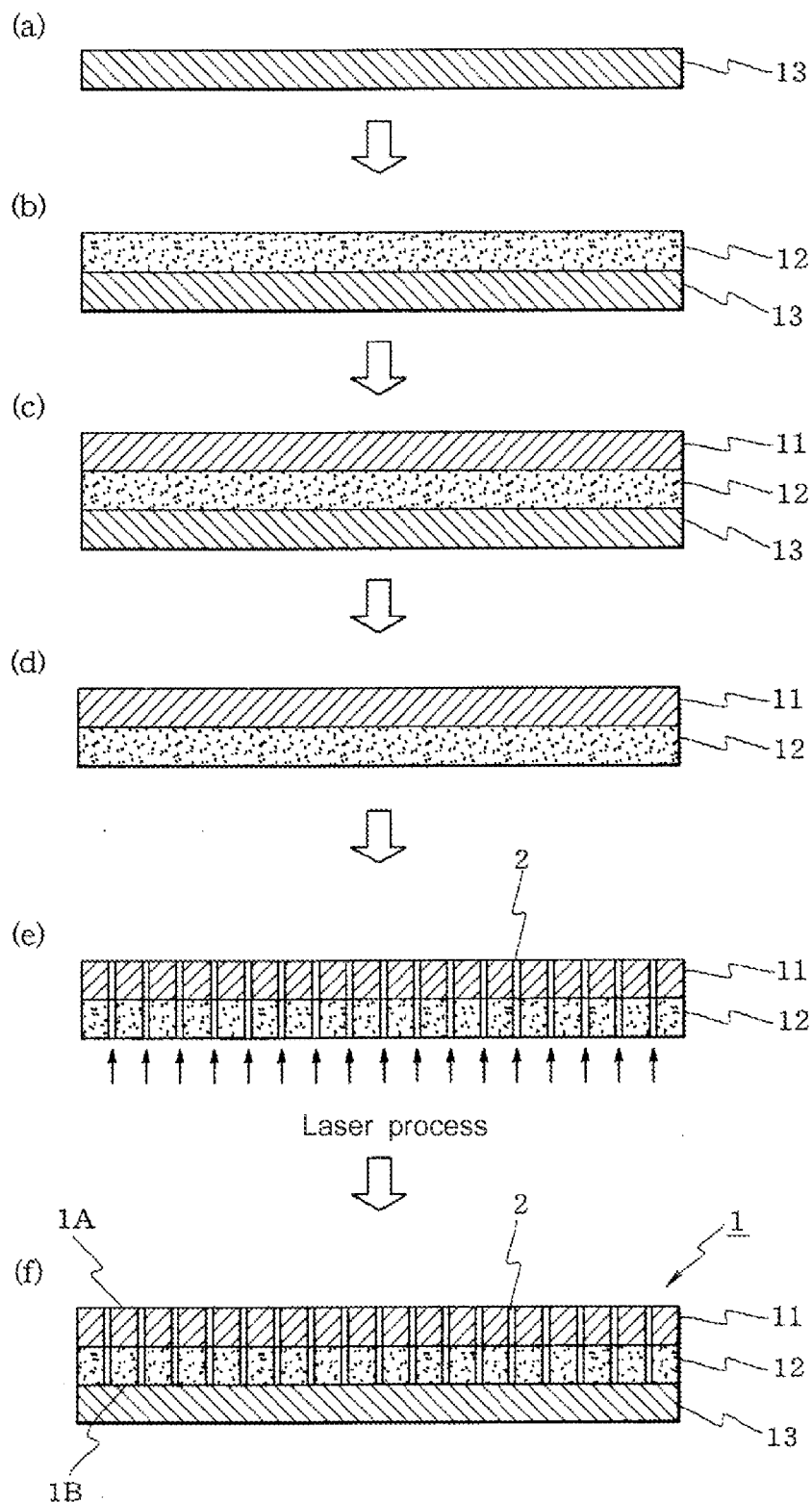

PRESSURE-SENSITIVE ADHESIVE SHEET

CROSS REFERENCE TO RELATED APPLICATIONS

This application is a U.S. national stage application of PCT/JP2011/054190 filed on Feb. 24, 2011, and claims priority to, and incorporates by reference, Japanese Patent Application No. 2010-047367 filed on Mar. 4, 2010.

TECHNICAL FIELD

The present invention relates to a pressure-sensitive adhesive sheet which allows for preventing or removing, for example, air entrapments and/or blisters.

BACKGROUND ART

When a pressure-sensitive adhesive sheet is manually applied to an adherend, air entrapments may occur between the adherend and the pressure-sensitive adhesive face thereby to detract the appearance of the pressure-sensitive adhesive sheet. Such air entrapments readily occur, particularly when the surface area of the pressure-sensitive adhesive sheet is large.

In addition, resin materials such as acrylic resin, ABS resin, polystyrene resin and polycarbonate resin may generate gases due to heating or other treatments, and if a pressure-sensitive adhesive sheet is applied to an adherend comprising such resin materials, then the gas generated from the adherend will cause blisters (swelling) between the adherend and the pressure-sensitive adhesive sheet.

In order to solve such problems as described above, a pressure-sensitive adhesive sheet has been proposed which is formed therein with through-holes having a hole diameter of 0.1 to 300 μm with a hole density of 30 to 50,000 holes/100 $cm^2$ (Patent Document 1). Such a pressure-sensitive adhesive sheet causes air and gases on the side of the pressure-sensitive adhesive face to escape via the through-holes towards the side of the surface of the pressure-sensitive adhesive sheet, thereby to allow for preventing air entrapments or blisters in the pressure-sensitive adhesive sheet.

In the pressure-sensitive adhesive sheet of Patent document 1, however, through-holes would possibly be visible by the naked eye depending on the hole diameter of the through-holes and/or the material of the base material, so that the appearance of the pressure-sensitive adhesive sheet might have not been necessarily good.

Accordingly, a pressure-sensitive adhesive sheet has been proposed in which a base material defined with its surface roughness (Ra), chroma (C*), lightness (L*) and contrast ratio is used, as well as defined with the hole diameter of through-holes in the base material and a pressure-sensitive adhesive layer, the hole diameter of the through-holes at the surface of the base material, the outer diameter of melted portions formed by laser around the through-holes at the surface of the base material, and the outer diameter of thermally deformed portions formed by laser around the through-holes or around the melted portions at the surface of the base material (Patent Document 2). The appearance of such a pressure-sensitive adhesive sheet is basically comparable to that of a pressure-sensitive adhesive sheet having no through-holes.

Patent Document 1: Domestic re-publication of PCT international application No. 2004/061032

Patent Document 2: Domestic re-publication of PCT international application No. 2005/121268

SUMMARY OF THE INVENTION

Problem to be Solved by the Invention

Actually, the formation of through-holes in the above pressure-sensitive adhesive sheet may employ a laser hole-forming process. Among laser hole-forming processes, a carbon dioxide laser process differs from laser ablation processes and is a so-called laser thermal process, which is a method to undergo a decomposition process of materials caused by heat.

When the above laser thermal process is performed for a resin film of which the base material is comprised of a polyolefin such as polyethylene or polypropylene, or a polyolefin-based thermoplastic elastomer, the material is merely molten during the laser light irradiation before being decomposed due to heat to vapor away, thereby expanding the inner diameter of the through-holes, because the thermal decomposition temperature of the material is high while the melting temperature is low. As the inner diameter of the through-holes becomes large in such a manner, the appearance of the pressure-sensitive adhesive sheet may be deteriorated due to sinking at the periphery of openings of the through-holes, or, in the case where the obtained pressure-sensitive adhesive sheet is applied to an adherend and a liquid such as water or gasoline then contacts the pressure-sensitive adhesive sheet, the appearance of the pressure-sensitive adhesive sheet may also be detracted due to reasons such as that the liquid comes into the through-holes to result in swelling of the portions of the through-holes (periphery portions of the through-holes).

Also in the pressure-sensitive adhesive sheet of Patent Document 2, the inner diameter of the through-holes would be expanded depending on the material of the base material thereby leading to problems as described above (particularly in the base material of Example 1.6 in Patent Document 2).

In addition, considering that the above pressure-sensitive adhesive sheet may be used out of door or for windows under solar light or for exteriors of cars/motorcycles, a pressure-sensitive adhesive sheet with poor weather resistance involves a problem that defects such as cracking and whitening occur over a short amount of time to thereby deteriorate the appearance. Therefore, a certain weather resistance is required for pressure-sensitive adhesive sheets intended to undergo such usages.

The present invention has been created in view of such problems, and objects thereof include providing an olefin-based pressure-sensitive adhesive sheet in which air entrapments and blisters can be prevented or removed via through-holes and the inner diameter of the through-holes is suppressed from being expanded thereby to provide a good appearance, and which has an excellent weather resistance.

Means for Solving the Problem

In order to achieve the above objects, the present invention provides a pressure-sensitive adhesive sheet comprising a base material and a pressure-sensitive adhesive layer and formed therein with a plurality of through-holes passing through from one surface to the other surface, the base material comprising a resin composition, the resin composition containing: 50 to 88 wt % of a polyolefin-based resin (A); 10 to 48 wt % of a styrene-based resin and/or an acrylic-based resin (B) excluding the polyolefin-based resin (A); and 2.0 to 30 wt % of a pigment (C) (Invention 1).

Conceptually, the term "sheet" as used herein includes films, and the terra "film" includes sheets.

In the above invention (Invention 1), the base material contains the styrene-based resin and/or acrylic-based resin (B) thereby enabling the through-holes to be efficiently formed with favorable shape using a thermal process, particularly a laser thermal process such as carbon dioxide laser process. Moreover, by blending the pigment (C) with an amount larger than ordinary blending amounts, an excellent advantageous effect can be obtained that a thermal damage to the base material is reduced and the inner diameter of the through-holes is suppressed from expanding, during the formation of through-holes in the base material by a thermal process, particularly by a laser thermal process, and more particularly by a carbon dioxide laser process. Furthermore, an additional advantageous effect is also obtained that the weather resistance of the base material is enhanced.

In the above invention (Invention 1), it is preferred that the polyolefin-based resin (A) is an ethylene-based copolymer including an ethylene structure as a structural unit (Invention 2).

In the above invention (Invention 1, 2), it is preferred that the polyolefin-based resin (A) is an ethylene-(meth)acrylic acid copolymer (Invention 3).

In the above invention (Invention 1 to 3), it is preferred that the pigment (C) has an absorption peak within a wavelength region of a carbon dioxide laser (Invention 4).

In the above invention (Invention 1 to 4), it is preferred that the pigment (C) is at least one type selected from the group of inorganic pigments (Invention 5).

In the above invention (Invention 1 to 5), it is preferred that the pigment (C) is carbon black (Invention 6).

In the above invention (Invention 1 to 6), it is preferred that the through-holes are formed by a thermal process (Invention 7).

In the above invention (Invention 7), it is preferred that the thermal process is a laser thermal process (Invention 8).

In the above invention (Invention 8), it is preferred that the laser used in the laser thermal process is a carbon dioxide laser (Invention 9).

In the above invention (Invention 1 to 9), it is preferred that a hole diameter of the through-holes at a surface of the base material is smaller than a hole diameter of the through-holes at a pressure-sensitive adhesive face of the pressure-sensitive adhesive layer (Invention 10).

Advantageous Effect of the Invention

The present invention provides a pressure-sensitive adhesive sheet which has an excellent weather resistance and in which air entrapments and blisters can be prevented or removed and the inner diameter of through-holes can be suppressed from being expanded even if the through-holes are formed by a thermal process such as a laser thermal process. In such a pressure-sensitive adhesive sheet, the appearance of the pressure-sensitive adhesive sheet is prevented from being deteriorated due to sinking of the periphery of openings of the through-holes, and, even in the case where a liquid such as water and gasoline comes into contact with the pressure-sensitive adhesive sheet after the pressure-sensitive adhesive sheet is applied to an adherend, the appearance of the pressure-sensitive adhesive sheet is also prevented from being detracted due to reasons such as that the liquid comes into the through-holes to result in swelling of the portions of the through-holes (periphery portions of the through-holes).

BRIEF DESCRIPTION OF DRAWINGS

FIG. 3 depicts cross-sectional views illustrating one example of a manufacturing method for the pressure-sensitive adhesive sheet according to one embodiment of the present invention.

MODE FOR CARRYING OUT THE INVENTION

Hereinafter, embodiments of the present invention will be described.

[Pressure-Sensitive Adhesive Sheet]

Figure 1:
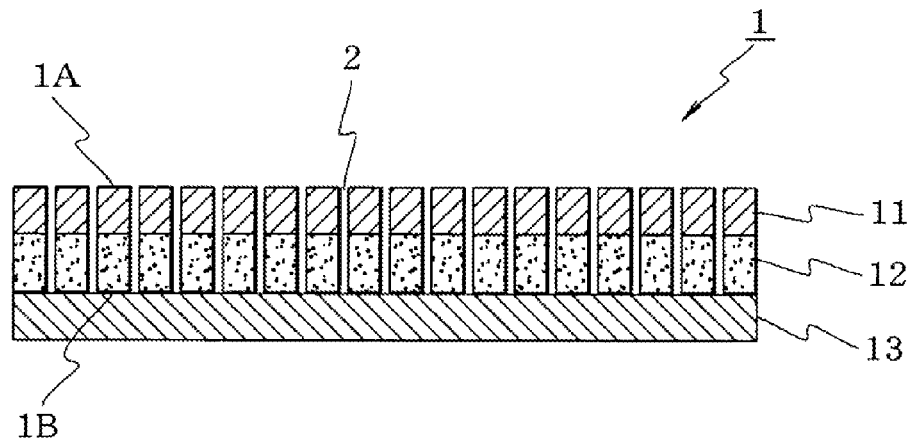
FIG. 1 is a cross-sectional view of a pressure-sensitive adhesive sheet according to one embodiment of the present invention.

FIG. 1 is a cross-sectional view of a pressure-sensitive adhesive sheet according to one embodiment of the present invention.

As shown in FIG. 1, a pressure-sensitive adhesive sheet 1 according to the present embodiment is obtained by laminating a base material 11, a pressure-sensitive adhesive layer 12, and a release liner 13. Note that the release liner 13 is to be removed when the pressure-sensitive adhesive sheet 1 is in use.

This pressure-sensitive adhesive sheet 1 is formed therein with a plurality of through-holes 2 which pass through the base material 11 and the pressure-sensitive adhesive layer 12 to extend from a base material surface 1A to a pressure-sensitive adhesive face 1B. During use of the pressure-sensitive adhesive sheet 1, air between an adherend and the pressure-sensitive adhesive face 1B of the pressure-sensitive adhesive layer 12, and/or gas generated from the adherend, may be escaped via the through-holes 2 out of the base material surface 1A, thereby to prevent air entrapments and blisters from occurring or to easily remove air entrapments having been generated, as will be described below.

The base material 11 has a main layer of a resin film, such as a film comprising a resin composition containing a polyolefin-based resin (A), a styrene-based resin and/or an acrylic-based resin (B) excluding the polyolefin-based resin (A) (which may hereinafter be referred to as "resin (B)") and a pigment (C), a foamed film comprising the resin composition, and a laminate film thereof.

The polyolefin-based resin (A) is a polymer having been polymerized or copolymerized using at least olefin-based hydrocarbon as a building monomer, and examples thereof thus include copolymers with other monomers such as (meth) acrylic acid and (meth) acrylic acid ester. Note that the term "(meth)acrylic acid" as used herein is intended to mean both acrylic acid and methacrylic acid. The same is true for other similar terms.

The polyolefin-based resin (A) may be selected from any known polyolefin-based resins, such as homopolymers of ethylene, propylene, butene-1, 3-methylbutene-1, 3-methylpentene-1, 4-methylpentene-1 and other α-olefins or copolymers thereof, and copolymers thereof with other monomers. Such polymers may be used alone, or two or more kinds may be blended for use. Examples of other monomers for the above copolymers include, such as, (meth)acrylic acid, (meth)acrylic acid ester, vinyl acetate, vinyl alcohol, and maleic anhydride.

Representative examples of the polyolefin-based resin (A) include high-density/medium-density/low-density polyethylene, linear low-density polyethylene, polypropylene, ethylene-(meth)acrylic acid copolymer, ethylene-(meth)acrylic acid alkyl ester copolymer, ethylene-vinyl acetate copolymer, ethylene-vinyl alcohol copolymer, ethylene-maleic anhydride copolymer, propylene-ethylene block copolymer and random copolymer thereof, propylene-ethylene-diene compound copolymer, and polybutene-1, poly4-methylpentene-1. Among them, preferred are ethylene-based copolymers including an ethylene structure as a structural unit, and particularly preferred is ethylene-(meth)acrylic acid copolymer. When such preferred polyolefin-based resins (ethylene-based copolymers), particularly ethylene-(meth)acrylic acid copolymer, are used, the resin (B) and the pigment (C) have good dispersibility and advantages are obtained including that the pigment (C) does not readily come away from a film formed of the resin composition even in a case where the pigment (C) is blended with a significant amount.

It is preferred that the mass average molecular weight of the polyolefin-based resin (A) ranges from 50,000 to 3,000,000 and particularly preferred is within the range from 10,000 to 500,000.

Considering the contained amount of the resin (B) and the pigment (C), the contained amount of the polyolefin-based resin (A) in the resin composition constituting the base material 11 ranges from 50 to 88 wt %, and preferably from 60 to 80 wt %.

Styrene-based resin as the resin (B) is a polymer having been polymerized or copolymerized using at least styrene as a building monomer, and examples thereof thus include copolymers with other monomers, for example, vinyl monomers such as butadiene; (meth)acrylic acid; (meth)acrylic acid ester; and (meth)acrylamide, but copolymers with olefin-based hydrocarbon are excluded from examples of styrene-based resin as the resin (B) because they fail under the above polyolefin-based resin (A).

Acrylic-based resin as the resin (B) is a polymer having been polymerized or copolymerized using at least (meth)acrylic acid and/or (meth)acrylic acid ester as a building monomer, and examples thereof thus include copolymers with other monomers such as vinyl monomer and styrene, but copolymers with olefin-based hydrocarbon are excluded from examples of acrylic-based resin as the resin (B) because they fall under the above polyolefin-based resin (A).

The above styrene-based resin and acrylic-based resin have a behavior that they are readily depolymerized by heating, and therefore, if the base material 11 contains the resin (B), then the through-holes 2 can be efficiently formed with favorable shape by using a thermal process, particularly a laser thermal process such as carbon dioxide laser process.

Examples of styrene-based resin include polystyrene resin, styrene-acrylic acid copolymer, styrene-acrylic acid ester copolymer, and styrene-butadiene-styrene block copolymer, for example, and they may be used alone, or two or more kinds may be blended for use.

Examples of acrylic-based resin include (meth)acrylic resin and (meth)acrylic acid alkyl ester resin, for example, and they may be used alone, or two or more kinds may be blended for use.

As the resin (B), styrene-based resin or acrylic-based resin may be used either alone, or styrene-based resin and acrylic-based resin may be used in combination.

It is preferred that the mass average molecular weight of styrene-based resin and acrylic-based resin ranges from 50,000 to 1,000,000, and particularly preferred is within the range from 10,000 to 500,000.

The contained amount of the resin (B) in the resin composition constituting the base material 11 (if styrene-based resin and acrylic-based resin are used in combination, total amount thereof) ranges from 10 to 48 wt %, and preferably from 15% to 35 wt %. If the contained amount of the resin (B) is within such ranges, then the through-holes 2 can be efficiently formed with favorable shape as described above. If, on the other hand, the contained amount of the resin (B) exceeds 48 wt %, then the weather resistance and/or the solvent resistance of the base material 11 may possibly be deteriorated.

In the present embodiment, the pigment (C) is blended with a larger amount than ordinary blending amounts with respect to the above polyolefin-based resin (A) and resin (B) to provide an advantageous effect of mitigating thermal damage on the base material 11 thereby suppressing expansion of the inner diameter of the through-holes 2 when the through-holes 2 are formed in the base material 11 by a thermal process, particularly by a laser thermal process, and more particularly by a carbon dioxide laser process. Moreover, an additional advantageous effect is also obtained that the weather resistance of the base material 11 is enhanced.

Figure 2:
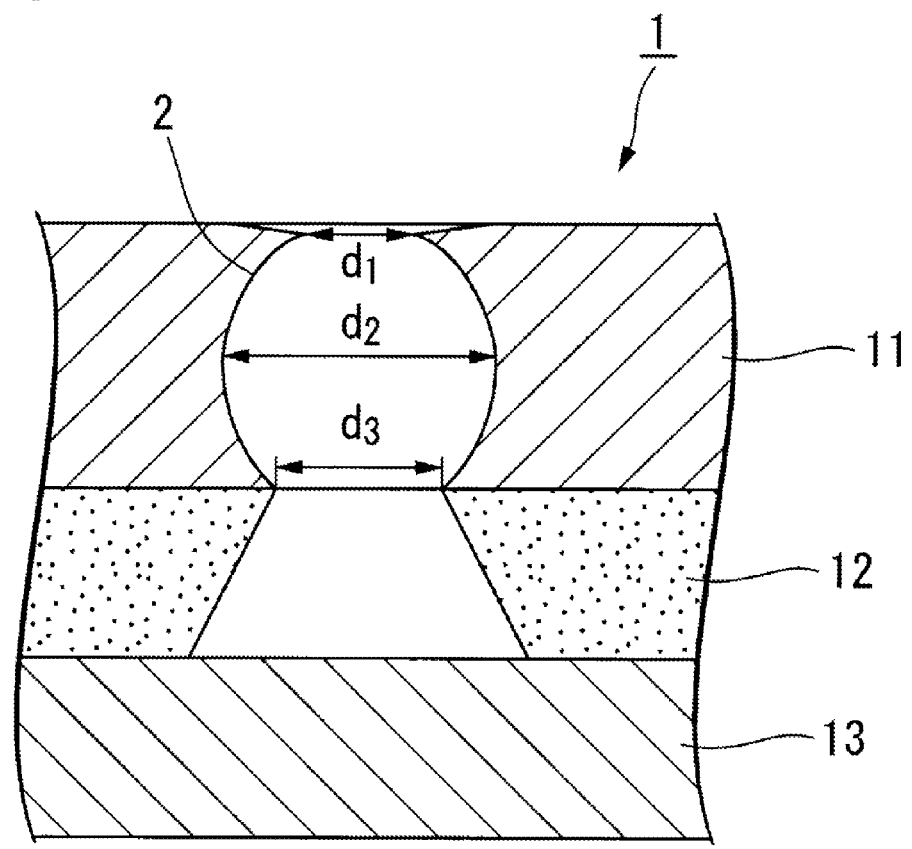
FIG. 2 is a partially enlarged cross-sectional views of a pressure-sensitive adhesive sheet, illustrating a through-hole having an expanded inner diameter.

Here, the inner diameter expansion of the through-holes 2 basically refers to a condition, as illustrated in FIG. 2, where the largest diameter $d_2$ of the through-holes 2 in the base material 11 is larger than the diameter $d_1$ of the through-holes 2 at the base material surface 1A and significantly larger than the diameter $d_3$ of the through-holes 2 at the interface between the base material 11 and the pressure-sensitive adhesive layer 12, but is not necessarily limited to such a condition, and also includes other conditions where the diameters ($d_1$ to $d_3$) of the through-holes 2 changes so as to give rise to the above problems. As the inner diameter of the through-holes 2 expands, the periphery of openings of the through-holes 2 tends to sink according to the diameter $d_2$ of the through-holes 2 (refer to FIG. 2).

The contained amount of pigment (C) in the resin composition constituting the base material 11 ranges from 2.0 to 30 wt %, and preferably from 2.5 to 20 wt %. If the contained of the pigment (C) is less than 2.0 wt %, then the above advantageous effects will not be obtained. If, on the other hand, the contained amount of pigment (C) exceeds 30 wt %, then the mechanical strength of the base material 11 and therefore of the pressure-sensitive adhesive sheet 1 will be reduced.

While the pigment (C) may be freely selected from known pigments, if the through-holes 2 are formed by a laser process, it is preferred to employ a pigment having its absorption peak or peaks within the wavelength region of the laser to be used. For example, in the case where the through-holes 2 are formed by carbon dioxide laser, it is preferred to employ a pigment having its absorption peak or peaks within the wavelength region (1087 to 962 $cm^{-1}$) of the carbon dioxide laser. This allows the through-holes 2 to be formed with a lower laser output.

Inorganic pigments and organic pigments are known as pigments, while inorganic pigments are superior in weather resistance and laser hole-forming workability. Therefore, it is preferred that the pigment (C) is at least one type selected from the group consisting of inorganic pigments.

Examples of inorganic pigments include such as carbon black, titanium black, talc, kaolin, bentonite, mica, titanium mica, bismuth oxychloride, zirconium oxide, yellow iron oxide, colcothar (red iron oxide), black iron oxide, ultramarine, chromium oxide, chromium hydroxide, and calamine. Among them, carbon black is particularly preferred. Carbon black is notably superior in the above effect of preventing the inner diameter expansion.

Here, it is known in general that the highest blending amount of carbon black in a polyolefin-based film is 1.00% ("Carbon Black Handbook", second edition, edited by Carbon Black Association and published by Toshosyuppan Co.

Ltd., May 25, 1972, p. 361, Table 3-1). That is, the contained amount of pigment (C) as being 2.0 wt % or more in the resin composition constituting the base material 11 as described above is an amount twice or more as much as the contained amount according to common technical knowledge in the art. Although it is unclear as to the blending amount of pigment in the black opaque base material comprised of a polyolefin-based thermoplastic elastomer used in Example 16 of Patent Document 2, it seems to be no more than 1.00 wt % in the film.

The resin film constituting the base material 11 in the present embodiment may further include various additives such as organic fillers, ultraviolet absorbing agents, and glidants.

The resin film constituting the base material 11 in the present embodiment may be manufactured not only by an ordinary method but by blending the pigment (C) as a master batch, for example.

Further, the above resin film may be formed by casting or other appropriate methods using a carrier sheet. Moreover, unless negatively affecting the shape of the through-holes 2, one or more decoration layers may be formed overlying the surface of the above resin film by a method such as printing, typing, application of a coating material, transfer from a transfer sheet, vapor deposition or sputtering, and one or more additional coat layers may also be formed, such as an adhesion facilitating coat for forming the decoration layer, a coat for gloss adjusting, a hard coat, an antifouling coat, a coat for adjusting surface roughness and specular gloss, or a coat for imparting weather resistance. Furthermore, such decoration layers or coat layers may be formed over the entire surface of the above resin film, or may partially be formed. Note that, when such decoration layers or coat layers are formed over the resin film, the resin film including such decoration layers or coat layers are referred to as the base material.

The thickness of the base material 11 ranges ordinarily from about 5 to 500 µm, preferably from about 10 to 400 µm, and most preferably from about 20 to 300 µm, but may be freely changed depending on the intended use of the pressure-sensitive adhesive sheet 1.

It is preferred that the total luminous transmittance of the base material 11 is 0.1% or less when the thickness of the base material 11 is 100 µm. Such a low total luminous transmittance exhibits that the pigment is sufficiently dispersed in the base material 11. This allows for the above effect of preventing the inner diameter expansion for each through-hole 2 to be formed in the base material 11. In addition, the pigment (C) for absorbing light is sufficiently dispersed to thereby improve the light stabilization performance of the base material 11, resulting in that the base material 11 has an excellent weather resistance.

The type of the pressure-sensitive adhesive constituting the pressure-sensitive adhesive layer 12 may be one which allows the through-holes 2 to be formed, such as, but not particularly limited to, an acrylic-based, polyester-based, polyurethane-based, rubber-based, silicone-based, or other appropriate type. Further, the pressure-sensitive adhesive may be of emulsion type, solvent type, or solventless type, and may also be of crosslinking type or non-crosslinking type.

The thickness of the pressure-sensitive adhesive layer 12 ranges ordinarily from about 1 to 300 µm, and preferably from about 5 to 100 µm, but may be freely changed depending on the intended use of the pressure-sensitive adhesive sheet 1.

The material of the release liner 13 is not particularly limited. As such a material there may be used a film comprising a resin such as polyethylene terephthalate, polypropylene, polyethylene or the like, a foamed film thereof, or paper such as glassine paper, coated paper, laminated paper or the like, which has been subjected to a release treatment using a release agent such as a silicone-based release agent, a fluorine-based release agent, or a carbamate containing a long-chain alkyl group.

The thickness of the release liner 13 ranges ordinarily from about 10 to 250 µm, and preferably from about 20 to 200 µm. Further, the thickness of the release agent in the release liner 13 ranges ordinarily from 0.05 to 5 µm, and preferably from 0.1 to 3 µm.

It is preferred that the hole diameter of the through-holes 2 ranges from 0.1 to 300 µm, and particularly preferred is from 0.5 to 150 µm, throughout the base material 11 and the pressure-sensitive adhesive layer 12 (at all positions in the thickness direction of the base material 11 and the pressure-sensitive adhesive layer 12). If the hole diameter of the through-holes 2 is less than 0.1 µm, then air or gas will not readily escape, whereas if the hole diameter exceeds 300 µm, then the through-holes 2 will be highly visible and the appearance of the pressure-sensitive adhesive sheet will thus be deteriorated. In addition, the mechanical strength of the pressure-sensitive adhesive sheet 1 may possibly be reduced if the hole diameter exceeds 300 µm. Notably when the through-holes 2 are required not to be visible within a close range, it is preferred that the hole diameter at the surface 1A of the base material 11 is set as being less than a value ranging from 0.1 to 40 µm.

The through-holes 2 may be formed, such as, but not particularly limited to, by means of water jet, micro-drill, precision press, or thermal process. In the present embodiment, the through-holes 2 are preferably formed by a thermal process, more preferably by a laser thermal process, and further preferably by a laser thermal process using a carbon dioxide laser. Such a process for forming the through-holes 2 allows for specifically exerting the above effect of preventing the inner diameter expansion.

It is preferred that the hole density of the through-holes 2 is 500 to 50,000 holes/100 $cm^2$, and particularly preferred is 1,000 to 10,000 holes/100 $cm^2$. If the hole density of the through-holes 2 is less than 500 holes/100 $cm^2$, then air or gas may not readily escape, whereas if the hole density of the through-holes 2 exceeds 50,000 holes/100 $cm^2$, then the tensile strength and/or the tear strength of the pressure-sensitive adhesive sheet 1 may possibly be reduced.

Note that, although the through-holes 2 in the pressure-sensitive adhesive sheet 1 according to the present embodiment are to pass through from the upper surface (base material surface 1A) of the base material 11 to the lower surface (pressure adhesive face 1B) of the pressure-sensitive adhesive layer 12, they may further pass through the release liner 13 as well.

The pressure-sensitive adhesive sheet 1 according to the present embodiment comprises the release liner 13, but the present invention is not limited thereto, and the release liner 13 may be omitted. Also, the size, shape and so forth of the pressure-sensitive adhesive sheet 1 according to the present embodiment are not particularly limited in any way. For instance, the pressure-sensitive adhesive sheet 1 may be a tape-like sheet (pressure-sensitive adhesive tape), comprising only the base material 11 and the pressure-sensitive adhesive layer 12, wound up in the form of a roll.

As described hereinbefore, the through-holes 2 have a shape in which the inner diameter thereof is suppressed from being expanded in the pressure-sensitive adhesive sheet 1 because the resin (B) is blended in the base material 11 and the pigment (C) is blended with a specific blending amount. Therefore, problems caused by the inner diameter expansion of the through-holes 2 can be prevented from occurring, that is, the appearance of the pressure-sensitive adhesive sheet 1 can be prevented from being deteriorated due to sinking of the periphery of openings of the through-holes 2, and, even in the case where a liquid such as water and gasoline comes into contact with the pressure-sensitive adhesive sheet 1 after the pressure-sensitive adhesive sheet 1 is applied to an adherend, the appearance of the pressure-sensitive adhesive sheet 1 can be also prevented from being detracted due to reasons such as that the liquid comes into the through-holes 2 to result in swelling of the portions of the through-holes 2 (periphery portions of the through-holes 2).

[Manufacture of Pressure-Sensitive Adhesive Sheet]

One example of a manufacturing method for the pressure-sensitive adhesive sheet 1 according to the above embodiment will be described with reference to (a) to (f) of FIG. 3.

In the present manufacturing method, as shown in (a) to (b) of FIG. 3, the pressure-sensitive adhesive layer 12 is firstly formed on a re lease-treated surface of the release liner 13. The pressure-sensitive adhesive layer 12 may be formed by: preparing a coating agent which contains an adhesive to constitute the pressure-sensitive adhesive layer 12 and if required further contains some solvent; applying the coating agent to the release-treated surface of the release liner 13 using a coater, such as roll coater, knife coater, roll knife coater, air knife coater, die coater, bar coater, gravure coater, or curtain coater; and drying it to obtain the pressure-sensitive adhesive layer 12.

Subsequently, as shown in (c) of FIG. 3, the base material 11 is superposed onto the surface of the pressure-sensitive adhesive layer 12 to provide a laminate comprising the base material 11, the pressure-sensitive adhesive layer 12, and the release liner 13. Thereafter, as shown in (d) of FIG. 3, the release liner 13 is peeled off from the pressure-sensitive adhesive layer 12, followed by forming through-holes 2 in a laminate comprising the base material 11 and the pressure-sensitive adhesive layer 12 as shown in (e) of FIG. 3, followed by applying again the release liner 13 to the pressure-sensitive adhesive layer 12 as shown in (f) of FIG. 3.

It is preferred that the formation of the through-holes 2 is performed by a thermal process. Examples of types of the thermal process include, such as, a laser thermal process, a thermal process using hot needles, and a thermal process by melting and boring, among which the laser thermal process is preferred because it allows for readily forming fine through-holes having good air-escaping ability with a desired hole density. Even if the through-holes 2 are formed using any of such thermal processes, the pressure-sensitive adhesive sheet 1 can be obtained to have a good appearance because the inner diameter of the through-holes 2 is suppressed from being expanded and a molten material is not readily produced.

Types of laser used in the laser thermal process include carbon dioxide ($CO_2$) laser, TEA-$CO_2$ laser, YAG laser, UV-YAG laser, $YVO_4$ laser, YLF laser and other lasers, among which the carbon dioxide laser is preferred in terms of production efficiency, cost and the like.

Note that the formation of the through-holes 2 using the laser thermal process involves a burst process (burst mode) in which laser light is continuously irradiated onto one site until one through-hole 2 is formed and which is thus superior from the view point of thermal efficiency, or a cycle process (cycle mode) in which plural through-holes 2 are uniformly formed through sequential irradiation of laser light onto plural sites and which is superior from the view point of reducing thermal impact on an object to be processed, and either mode may be used for the above laser thermal process.

When performing the laser thermal process, it is preferred that the laser light is irradiated from the side of the pressure-sensitive adhesive layer 12 towards the side of the base material 11. By performing the laser thermal process from the side of the pressure-sensitive adhesive layer 12, the hole diameter of the through-holes 2 at the base material surface 1A becomes smaller than the hole diameter at the pressure-sensitive adhesive face 1B of the pressure-sensitive adhesive layer 12. Further, by irradiating the laser light directly onto the pressure-sensitive adhesive layer 12 after temporarily peeling off the release liner 13, the output energy of the laser can be reduced. Reducing the output energy of the laser allows for forming neatly shaped through-holes 2 with fewer molten materials and thermally deformed portions due to the heat.

While the peripheral edges of openings of the through-holes 2 may not readily be formed thereon with molten materials by the laser thermal process, even if such molten materials attach, a protective film previously applied to the surface of the base material 11 can prevent molten materials from attaching. As the protective film, there can be used a known protective film that is used for surface protection of construction materials or metal plates. Further, when the base material 11 is produced by a casting method, the laser thermal process may be performed in a state where a carrier sheet for casting is still laminated on the surface of the base material 11.

In the above manufacturing method, the pressure-sensitive adhesive layer 12 is formed by applying to the release liner 13 to be formed, and the formed pressure-sensitive adhesive layer 12 and the base material 11 are then laminated to each other, but the present invention is not limited thereto, and the pressure-sensitive adhesive layer 12 may directly be applied to the base material 11 to be formed thereon.

[Use of Pressure-Sensitive Adhesive Sheet]

At the time of attaching the pressure-sensitive adhesive sheet 1 to an adherend, the release liner 13 is firstly removed from the pressure-sensitive adhesive layer 12.

Next, the pressure-sensitive adhesive sheet 1 is pressed against the adherend so that the exposed pressure-sensitive adhesive face 1B of the pressure-sensitive adhesive layer 12 is brought into close contact with the adherend. At this time, the air between the adherend and the pressure-sensitive adhesive face 1B of the pressure-sensitive adhesive layer 12 is escaped out of the base material surface 1A via the through-holes 2 formed in the pressure-sensitive adhesive sheet 1, thereby resulting in that the adherend and the pressure-sensitive adhesive face 1B are unlikely to entrap air therebetween, and formation of air entrapments is thus prevented. Even if air entrapments would be formed as a result of air becoming caught during the attaching operations, re-pressing the air entrapment portions or air entrapment peripheral portions that encompass the air entrapment portions enables the air to escape out of the surface of the base material 1A via the through-holes 2, and the air entrapments are thus eliminated. Such removal of air entrapments is also possible after a long period of time has elapsed from the time of applying the pressure-sensitive adhesive sheet 1.

Further, even if a gas is generated from the adherend after the pressure-sensitive adhesive sheet 1 has been applied to the adherend, such gas may escape out of the base material surface 1A via the through-holes 2 formed in the pressure-sensitive adhesive sheet 1 to thereby prevent blisters from occurring in the pressure-sensitive adhesive sheet 1.

EXAMPLE

The present invention will hereinafter be more specifically described with reference to examples etc., but the scope of the present invention is not to be limited to these examples etc.

Example 1

Kneaded pellets were prepared from a mixture of 88 wt % of ethylene-methacrylic acid copolymer (Nucrel N0903HC manufactured by DUPONT-MITSUI POLYCHEMICALS CO., LTD.) as the polyolefin-based resin, 10 wt % of styrene-butadiene-styrene resin (TR2250 manufactured by JSR Corporation) as the styrene-based resin, and 2.0 wt % of carbon black (SUNBLACK 200 manufactured by ASAHI CARBON CO., LTD.) as the pigment, using a biaxial extrusion kneading machine (KZW25TWIN-30MG-STM manufactured by TECHNOVEL CORPORATION). A film with thickness of 100 μm was then produced from the above kneaded pellets using an extrusion tester (Labo-plastomill 30C150 manufactured by Toyo Seiki Seisaku-Sho, LTD). The obtained film was used as a base material for a pressure-sensitive adhesive sheet. The blending of materials constituting that base material is shown in Table 1 (here and hereinafter).

A coating agent of acrylic-based solvent-type pressure-sensitive adhesive (PK manufactured by LINTEC Corporation) was applied using a knife coater to the release-treated surface of a release liner (FPM-11, thickness: 175 μm, manufactured by LINTEC Corporation), which was obtained by laminating a polyethylene resin onto both faces of woodfree paper and subjecting one face thereof to release treatment using a silicone-based release agent, and the coating agent was then dried at 90 degrees C. during 1 minute to have a thickness of 30 μm after drying. The pressure-sensitive adhesive layer obtained in such a manner was superposed thereto with the above film as the base material, and the surface of the base material was attached thereon with a protective sheet (E-2035, thickness: 60 μm, manufactured by SUMIRON Corporation) having a removable pressure-sensitive adhesive layer to thereby provide a laminate of 4-layers structure.

The release liner was peeled off from the above laminate, and the residual laminate was irradiated thereto with a carbon dioxide laser (using YB-HCS03 manufactured by Matsushita Industrial Equipment Co., Ltd., two-shot burst process, frequency: 10,000 Hz, pulse width: 25 μsec (first shot)/12 μsec (second shot)) from the side of the pressure-sensitive adhesive layer to form through-holes with a hole density of 2,500 holes/100 cm$^2$ (hole pattern: parallel-type, pitch distance: 2 mm). Thereafter, the above release liner was superposed again onto the pressure-sensitive adhesive layer, and the protective sheet was removed from the surface of the base material to provide a pressure-sensitive adhesive sheet.

Example 2

Kneaded pellets were prepared from a mixture of 60 wt % of ethylene-methacrylic acid copolymer (Nucrel N0903HC manufactured by DUPONT-MITSUI POLYCHEMICALS CO., LTD.) as the polyolefin-based resin, 10 wt % of styrene-butadiene-styrene resin (TR2250 manufactured by JSR Corporation) as the styrene-based resin, and 30.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Example 3

Kneaded pellets were prepared from a mixture of 50 wt % of ethylene-methacrylic acid copolymer (Nucrel N0903HC manufactured by DUPONT-MITSUI POLYCHEMICALS CO., LTD.) as the polyolefin-based resin, 48 wt % of styrene-butadiene-styrene resin (TR2250 manufactured by JSR Corporation) as the styrene-based resin, and 2.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Example 4

Kneaded pellets were prepared from a mixture of 88 wt % of ethylene-methacrylic acid copolymer (Nucrel N0903HC manufactured by DUPONT-MITSUI POLYCHEMICALS CO., LTD.) as the polyolefin-based resin, 10 wt % of polymethylmethacrylate (manufactured by ALDRICH Corporation) as the acrylic-based resin, and 2.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Example 5

Kneaded pellets were prepared from a mixture of 60 wt % of ethylene-methacrylic acid copolymer (Nucrel N0903HC manufactured by DUPONT-MITSUI POLYCHEMICALS CO., LTD.) as the polyolefin-based resin, 10 wt % of polymethylmethacrylate (manufactured by ALDRICH Corporation) as the acrylic-based resin, and 30.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Example 6

Kneaded pellets were prepared from a mixture of 50 wt % of ethylene-methacrylic acid copolymer (Nucrel N0903HC manufactured by DUPONT-MITSUI POLYCHEMICALS CO., LTD.) as the polyolefin-based resin, 48 wt % of polymethylmethacrylate (manufactured by ALDRICH Corporation) as the acrylic-based resin, and 2.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Example 7

Kneaded pellets were prepared from a mixture of 65 wt % of ethylene-methyl methacrylate copolymer (ACRYFT WD301 manufactured by Sumitomo Chemical Company, Limited) as the polyolefin-based resin, 35 wt % of styrene-butadiene-styrene resin (TR2250 manufactured by JSR Corporation) as the styrene-based resin, and 5.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Example 8

Kneaded pellets were prepared from a mixture of 65 wt % of metallocene low-density polyethylene (Sumikathene EP GT050 manufactured by Sumitomo Chemical Company, Ltd.) as the polyolefin-based resin, 35 wt % of styrene-butadiene-styrene resin (TR2250 manufactured by JSR Corporation) as the styrene-based resin, and 5.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Comparative Example 1

Kneaded pellets were prepared from a mixture of 60 wt % of ethylene-methacrylic acid copolymer (Nucrel N0903HC manufactured by DUPONT-MITSUI POLYCHEMICALS CO., LTD.) as the polyolefin-based resin, 39 wt % of styrene-butadiene-styrene resin (TR2250 manufactured by JSR Corporation) as the styrene-based resin, and 1.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Comparative Example 2

Kneaded pellets were prepared from a mixture of 55 wt % of ethylene-methacrylic acid copolymer (Nucrel N0903HC manufactured by DUPONT-MITSUI POLYCHEMICALS CO., LTD.) as the polyolefin-based resin, 5 wt % of styrene-butadiene-styrene resin (TR2250 manufactured by JSR Corporation) as the styrene-based resin, and 40.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Comparative Example 3

Kneaded pellets were prepared from a mixture of 40 wt % of ethylene-methacrylic acid copolymer (Nucrel N0903HC manufactured by DUPONT-MITSUI POLYCHEMICALS CO., LTD.) as the polyolefin-based resin, 55 wt % of styrene-butadiene-styrene resin (TR2250 manufactured by JSR Corporation) as the styrene-based resin, and 5.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Comparative Example 4

Kneaded pellets were prepared from a mixture of 65 wt % of ethylene-methacrylic acid copolymer (Nucrel N0903HC manufactured by DUPONT-MITSUI POLYCHEMICALS CO., LTD.) as the polyolefin-based resin, 30 wt % of polycaprolactone (Placcel H7 manufactured by Daicel Chemical Industries, Ltd.) as being polyester-based resin, and 5.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

Comparative Example 5

Kneaded pellets were prepared from a mixture of 94 wt % of ethylene-methacrylic acid copolymer (Nucrel N0903HC manufactured by DUPONT-MITSUI POLYCHEMICALS CO., LTD.) as the polyolefin-based resin, 5 wt % of styrene-butadiene-styrene resin (TR2250 manufactured by JSR Corporation) as the styrene-based resin, and 1.0 wt % of carbon black (SUNBLACK 200 manufactured by ASAHI CARBON CO., LTD.) as the pigment, using the biaxial extrusion kneading machine (KZW25TWIN-30MG-STM manufactured by TECHNOVEL CORPORATION). A pressure-sensitive adhesive sheet was manufactured in a similar manner to Example 1 except for using those kneaded pellets.

[tests]

(1) Observation of Through-Hole Shape

The pressure-sensitive adhesive sheets obtained in the Examples and Comparative Examples were cut at portions of the through-holes, and diameter measurement was performed each for the diameter of the through-holes at the base material surface, the largest diameter in the base material, the diameter at the interface between the base material and the pressure-sensitive adhesive layer, and the diameter at the pressure-sensitive adhesive face using a digital microscope (VHX-200 manufactured by KEYENCE CORPORATION). In addition, five areas of 1 cm$^2$ were randomly chosen, and the number of holes passing through within each area was counted for calculating the average number of through-holes per 1 cm$^2$. Results are given in Table 2.

(2) Infrared Spectrophotometric Measurement

Measurement was performed for the base materials used in the Examples and Comparative Examples by universal ATR method using a Fourier transform infrared spectrophotometer (FT-IR Spectrum One manufactured by Perkin Elmer Inc.) to check the presence or absence of absorption peaks (FT-IR absorption peaks) within the wavelength region (1087 to 962 cm$^{-1}$) of the laser used. Results are given in Table 2. In Table 2, "O" denotes presence of absorption and "X" denotes absence of absorption.

(3) Measurement of Total Luminous Transmittance

Each total luminous transmittance (%) of the base materials used in the Examples and the Comparative Examples was measured in compliance with JIS K 7361 using a haze meter (NDH5000 manufactured by NIPPON DENSHOKU INDUSTRIES CO., LTD). Results are given in Table 2.

(4) Appearance Check

Each appearance of the pressure-sensitive adhesive sheets obtained in the Examples and Comparative Examples was checked in such a manner as described below. Results are given in Table 3.

Each pressure-sensitive adhesive sheet (size: 30 mm×30 mm) removed therefrom with the release liner was attached to a melamine-coated plate, and the appearance of the surface of the pressure-sensitive adhesive sheet was checked by the naked eye under indoor fluorescent light tubes. Note that the distance from the eyes to the pressure-sensitive adhesive sheet was set as being about 30 cm, and the angle for viewing the pressure-sensitive adhesive sheet was widely changed. As results thereof, "O" denotes a case where no through-hole was recognized by the naked eye, and "X" denotes a case where through-holes were recognized by the naked eye.

(5) Weather Resistance Test

The pressure-sensitive adhesive sheets obtained in the Examples and Comparative Examples were subjected to a weather resistance test as described below. Results are given in Table 2.

Each pressure-sensitive adhesive sheet (size: 50 mm×50 mm) removed therefrom with the release liner was attached to a melamine coated plate and subjected during 2,000 hours to a cycle condition of the black panel temperature of 63 degrees C., the temperature in a chamber of 43 degrees C., the humidity of 50% RH, the irradiance of 60 W/m², and the 1 cycle time of 120 minutes (the rainfall time of 18 minutes) using Sunshine Weather Meter (S80 manufactured by Suga Test Instruments Co., Ltd.), thereafter being visually checked for the appearance of the surface of the pressure-sensitive adhesive sheet. As results thereof, "O" denotes a case where no defect (such as cracking or whitening) was recognized, and "X" denotes a case where defects were recognized.

(6) Air Entrapment Removability Test 1

The pressure-sensitive adhesive sheets obtained in the Examples and Comparative Examples were subjected to an air entrapment removability test as described below. Results are given in Table 3.

Each pressure-sensitive adhesive sheet (size: 50 mm×50 mm) removed therefrom with the release liner was attached to a flat melamine-coated plate to be formed therebetween with an air entrapment having a diameter of about 15 mm, and the pressure-sensitive adhesive sheet was pressed with a squeegee, thereafter being checked as to whether the air entrapment could be removed or not. As results thereof, "O" denotes a case where the air entrapment could be removed, and "X" denotes a case where the air entrapment could not be removed.

(7) Air Entrapment Removability Test 2

The pressure-sensitive adhesive sheets obtained in the Examples and Comparative Examples were subjected to an air entrapment removability test as described below. Results are given in Table 3.

Each pressure-sensitive adhesive sheet (size: 50 mm×50 mm) removed therefrom with the release liner was attached to a 70 mm×70 mm melamine-coated plate having a partially spherical depression (recess) with a diameter of 15 mm and a maximum depth of 1 mm (an air entrapment thus existing between the depression and the pressure-sensitive adhesive sheet), and the pressure-sensitive adhesive sheet was pressed with a squeegee, thereafter being checked as to whether the air entrapment could be removed or not. As results thereof, "O" denotes a case where the pressure-sensitive adhesive sheet followed the recess of the melamine-coated plate and the air entrapment could be removed, and "X" denotes a case where the pressure-sensitive adhesive sheet did not follow the recess of the melamine-coated plate and the air entrapment could not be removed (including a case where the air entrapment still remained even with smaller size).

(8) Measurement of Breaking Strength

The base materials used in the Examples and Comparative Examples were measured for breaking strength (MPa) in compliance with JIS K 7127 using a precision universal tester (AUTOGRAPH AG-IS manufactured by SHIMADZU CORPORATION). Note that the measurement of breaking strength was performed in each of the machine direction (MD) and the cross-machine direction (CD) of the base material. Results are given in Table 3.

(9) Gasoline Resistance Test

The pressure-sensitive adhesive sheets obtained in the Examples and Comparative Examples were subjected to a Gasoline resistance test as described below. Results are given in Table 3.

Each pressure-sensitive adhesive sheet left during 24 hours after attached to a melamine-coated plate as in the above (4) was immersed into gasoline of room temperature during 0.5 hours and then taken out and dried, thereafter being observed for the appearance as in the above (4). As results thereof, "O" denotes a case where no through-hole was recognized by the naked eye, and "X" denotes a case where through-holes were recognized by the naked eye or the pressure-sensitive adhesive sheet itself had a significant appearance defect.

TABLE 1

|  | A-1 (Parts by mass) | A-2 (Parts by mass) | A-3 (Parts by mass) | B-1 (Parts by mass) | B-2 (Parts by mass) | B-3 (Parts by mass) | C (Parts by mass) |
| --- | --- | --- | --- | --- | --- | --- | --- |
| Example 1 | 88 | — | — | 10 | — | — | 2.0 |
| Example 2 | 60 | — | — | 10 | — | — | 30.0 |
| Example 3 | 50 | — | — | 48 | — | — | 2.0 |
| Example 4 | 88 | — | — | — | 10 | — | 2.0 |
| Example 5 | 60 | — | — | — | 10 | — | 30.0 |
| Example 6 | 50 | — | — | — | 48 | — | 2.0 |
| Example 7 | — | 65 | — | 35 | — | — | 5.0 |
| Example 8 | — | — | 65 | 35 | — | — | 5.0 |
| Comparative Example 1 | 60 | — | — | 39 | — | — | 1.0 |
| Comparative Example 2 | 55 | — | — | 5 | — | — | 40.0 |
| Comparative Example 3 | 40 | — | — | 55 | — | — | 5.0 |
| Comparative Example 4 | 65 | — | — | — | — | 30 | 5.0 |
| Comparative Example 5 | 94 | — | — | 5 | — | — | 1.0 |

A-1: Ethylene-methacrylic acid copolymer (Nucrel N0903HC manufactured by DUPONT-MITSUI POLYCHEMICALS CO., LTD.)
A-2: Ethylene-methyl methacrylate copolymer (ACRYFT WD301 manufactured by Sumitomo Chemical Company, Limited)
A-3: Metallocene low-density polyethylene (Sumikathene EP GT050 manufactured by Sumitomo Chemical Co., Ltd.)
B-1: Styrene-butadiene-styrene resin (TR2250 manufactured by JSR Corporation)
B-2: Polymethylmethacrylate (manufactured by ALDRICH Corporation)
B-3: Polycaprolactone (Placcel H7 manufactured by Daicel Chemical Industries, Ltd.)
C: Carbon black (SUNBLACK 200 manufactured by ASAHI CARBON CO., LTD.)

TABLE 2

| | Diameter of through-holes (μm) | | | | Number of passing through (holes/cm²) | Presence or absence of FT-IR peaks | Total luminous transmittance (%) |
|---|---|---|---|---|---|---|---|
| | Base material surface | Material base largest diameter | Interface | Pressure-sensitive adhesive face | | | |
| Example 1 | 25 to 30 | 75 | 65 to 75 | 65 to 75 | 25 | ○ | 0.0 |
| Example 2 | 25 to 30 | 70 | 65 to 70 | 65 to 75 | 25 | ○ | 0.0 |
| Example 3 | 25 to 30 | 65 | 65 to 65 | 65 to 75 | 25 | ○ | 0.0 |
| Example 4 | 25 to 30 | 70 | 60 to 70 | 65 to 75 | 25 | ○ | 0.0 |
| Example 5 | 20 to 30 | 70 | 65 to 70 | 65 to 75 | 25 | ○ | 0.0 |
| Example 6 | 20 to 30 | 70 | 65 to 70 | 65 to 75 | 25 | ○ | 0.0 |
| Example 7 | 20 to 30 | 65 | 60 to 65 | 65 to 75 | 25 | ○ | 0.0 |
| Example 8 | 20 to 30 | 65 | 60 to 65 | 65 to 75 | 25 | ○ | 0.0 |
| Comparative Example 1 | 25 to 30 | 70 | 65 to 70 | 65 to 75 | 25 | ○ | 0.0 |
| Comparative Example 2 | 25 to 30 | 70 | 65 to 70 | 65 to 75 | 25 | ○ | 0.0 |
| Comparative Example 3 | 25 to 30 | 70 | 65 to 70 | 65 to 75 | 25 | ○ | 0.0 |
| Comparative Example 4 | 25 to 30 | 70 | 65 to 70 | 65 to 75 | 25 | ○ | 0.0 |
| Comparative Example 5 | 0 to 5 | 75 | 60 to 65 | 65 to 75 | 15 | ○ | 0.0 |

TABLE 3

| | Appearance check | Weather resistance | Air entrapment removability 1 | Air entrapment removability 2 | Breaking strength (MPa) MD | Breaking strength (MPa) CD | Gasoline resistance test |
|---|---|---|---|---|---|---|---|
| Example 1 | ○ | ○ | ○ | ○ | 30.5 | 28.7 | ○ |
| Example 2 | ○ | ○ | ○ | ○ | 22.1 | 21.5 | ○ |
| Example 3 | ○ | ○ | ○ | ○ | 23.1 | 22.7 | ○ |
| Example 4 | ○ | ○ | ○ | ○ | 29.8 | 29 | ○ |
| Example 5 | ○ | ○ | ○ | ○ | 21.5 | 20.8 | ○ |
| Example 6 | ○ | ○ | ○ | ○ | 20.9 | 20.5 | ○ |
| Example 7 | ○ | ○ | ○ | ○ | 23.7 | 22.6 | ○ |
| Example 8 | ○ | ○ | ○ | ○ | 21.6 | 20 | ○ |
| Comparative Example 1 | ○ | x | ○ | ○ | 27.5 | 24.3 | ○ |
| Comparative Example 2 | ○ | ○ | ○ | ○ | 5.3 | 4.2 | ○ |
| Comparative Example 3 | ○ | ○ | ○ | ○ | 17.2 | 16.4 | x |
| Comparative Example 4 | ○ | x | ○ | ○ | 22.5 | 21.4 | ○ |
| Comparative Example 5 | ○ | x | ○ | x | 28.6 | 25.4 | ○ |

As understood from Table 1 to Table 3, the pressure-sensitive adhesive sheets (Examples 1 to 8) using base materials in accordance with the conditions of the present invention had superior air-escaping ability, and exhibited a good appearance, with through-holes invisible to the naked eye and with no expansion of the inner diameter. In addition, the pressure-sensitive adhesive sheets also exhibited excellent weather resistance, Gasoline resistance, and mechanical strength.

However, the pressure-sensitive adhesive sheets (Comparative Examples 1 to 5) using base materials not in accordance with the conditions of the present invention were poor in at least one of the weather resistance, Gasoline resistance, and mechanical strength. Notably, in the pressure-sensitive adhesive sheet of Comparative Example 5, the diameter of the through-holes at the base material surface was small, the inner diameter was expanded, and the air entrapment removability, Gasoline resistance and weather resistance were less than those of the pressure-sensitive adhesive sheets in Examples.

INDUSTRIAL APPLICABILITY

The pressure-sensitive adhesive sheet of the present invention can be preferably used in cases where good appearance is required and/or weather resistance is required, not only under ordinary environments but also under environments in which a liquid such as gasoline comes into contact with the pressure-sensitive adhesive sheet, even when air entrapments or blisters are likely to occur in general in the pressure-sensitive adhesive sheet, for example, when the surface area of the pressure-sensitive adhesive sheet is large or when a gas is released from the adherend.

EXPLANATION OF REFERENCE NUMERALS

1 pressure-sensitive adhesive sheet
  11 base material
  12 pressure-sensitive adhesive layer
  13 release liner 1A base material surface
1B pressure-sensitive adhesive face
2 through-hole

The invention claimed is:

1. A pressure-sensitive adhesive sheet having improved weather resistance comprising a base material and a pressure-sensitive adhesive layer and having a plurality of through-holes passing through from one surface to the other surface,
the base material comprising a blended resin composition, the blended resin composition containing:
(A) 50 to 88 wt % of a polyolefin-based resin;
(B) 10 to 48 wt % of a resin depolyrmerizable by heating selected from the group consisting of a styrene-based resin and an acrylic-based resin excluding the polyolefin-based resin (A); and
(C) 2.0 to 30 wt % of a pigment selected from the group consisting of light-absorbing inorganic pigments, the pigment being sufficiently dispersed within the blended resin composition for improving the weather resistance of the base material; and
the pressure-sensitive adhesive sheet has an improved weather resistance determined by the appearance of no cracking or whitening defects on a surface of a 50 mm×50 mm sized test sheet of the pressure-sensitive adhesive sheet, after attaching the test sheen. without any release liner to a melamine coated plate, and subjecting the attached test sheet to weather resistance testing using a Sunshine Weather Meter (S80 manufactured by Suga Test Instruments Co., Ltd.) for 2000 hours under conditions of a black panel temperature of 63° C. a temperature and humidity in the chamber of 43° C. and 50% RH, an irradiance of 60 W/m$^2$, and a cycle time of water spray (rainfall) of 18 minutes per every 120 minutes.

2. The pressure-sensitive adhesive sheet according to claim 1, wherein the polyolefin-based resin (A) is an ethylene-based copolymer including an ethylene structure as a structural unit.

3. The pressure-sensitive adhesive sheet according to claim 1, wherein the polyolefin-based resin (A) is an ethylene (meth)acrylic acid copolymer.

4. A pressure-sensitive adhesive sheet having improved weather resistance comprising:
a base material comprising a blended resin composition having:
(A) 50 to 88 wt % of a polyolefin-based resin;
(B) 10 to 48 wt % of a resin depolymerizahle by heating selected from the group consisting of a styrene-based resin and an acrylic-based resin excluding the polyolefin- based resin (A); and
(C) 2.0 to 30 wt % of a pigment selected from the group consisting of inorganic pigments having an absorption peak within a wavelength region of a laser configured to form through holes in the base material at least in part by melting the base material, the pigment being sufficiently dispersed within the blended resin composition for improving the weather resistance of the base material;
a pressure-sensitive adhesive layer covering the base layer, wherein the through-holes extend from one outer surface of the pressure-sensitive adhesive sheet completely through both the base material and the pressure-sensitive adhesive layer to another outer surface of the pressure-sensitive adhesive sheet, and
the improved weather resistance of the pressure-sensitive adhesive sheet is determined by the appearance of no cracking or whitening defects on a surface of a 50 mm×50 mm sized test sheet of the pressure-sensitive adhesive sheet, after attaching the test sheet without any release liner to a melamine coated plate, and subjecting the attached test sheet to weather resistance testing using a Sunshine Weather Meter (S80 manufactured by Saga Test Instruments Co., Ltd.) for 2000 hours under conditions of a black panel temperature of 63° C., a temperature and humidity in the chamber of 43° C. and 50% RH, an irradiance of 60 W/m$^2$, and a cycle time of water spray (rainfall) of 18 minutes per every 120 minutes.

5. The pressure-sensitive adhesive sheet according to claim 1, wherein the pigment (C) is carbon black.

6. The pressure-sensitive adhesive sheet according to claim 1, wherein the through-holes are formed by a thermal process.

7. The pressure-sensitive adhesive sheet according to claim 6, wherein the thermal process is a laser thermal process.

8. The pressure-sensitive adhesive sheet according to claim 7, wherein the laser used in the laser thermal process is a carbon dioxide laser.

9. The pressure-sensitive adhesive sheet according to claim 1, wherein a hole diameter of the through-holes at a surface of the base material is smaller than a hole diameter of the through-holes at a pressure-sensitive adhesive face of the pressure- sensitive adhesive layer.

10. The pressure-sensitive adhesive sheet according to claim 4, wherein the polyolefin-based resin (A) is an ethylene-(meth)acrylic acid copolymer.

11. The pressure-sensitive adhesive sheet according to claim 2, wherein the pigment (C) has an absorption peak within a wavelength region of a carbon dioxide laser.

12. The pressure-sensitive adhesive sheet according to claim 3, wherein the pigment (C) has an absorption peak within a wavelength region of a carbon dioxide laser.

13. The pressure-sensitive adhesive sheet according to claim 2, wherein the pigment (C) is carbon black.

14. The pressure-sensitive adhesive sheet according to claim 3, wherein the pigment (C) is carbon black.

15. The pressure-sensitive adhesive sheet according to claim 4, wherein the pigment (C) is carbon black.

16. A pressure-sensitive adhesive sheet having improved weather resistance and a plurality of through-holes formed by laser thermal processing, comprising:
a base material comprising a blended resin composition having:
(A) 50 to 88 wt % of a polyolefin-based resin;
(B) 10 to 48 wt % of a resin depolyrmerizable by heating selected from the group consisting of a styrene-based resin and an acrylic-based resin excluding the polyolefin- based resin (A); and
(C) 2.0 to 30 wt % of a carbon black pigment sufficiently dispersed within the blended resin composition for improving the weather resistance of the base material; and
a pressure-sensitive adhesive layer covering the base layer, wherein
the through-holes extend from one outer surface of the pressure-sensitive adhesive sheet completely through both the base material and the pressure-sensitive adhesive layer to another outer surface of the pressure-sensitive adhesive sheet, and
the improved weather resistance of the pressure-sensitive adhesive sheet is determined by the appearance of no cracking or whitening defects on a surface of a 50 mm×50 mm sized test sheet of the pressure-sensitive adhesive sheet, after attaching the test sheet without any release liner to a melamine coated plate, and subjecting the attached test sheet to weather resistance testing using a Sunshine Weather Meter (S80 manufactured by Suga Test Instruments Co, Ltd.) for 2000 hours under conditions of a black panel temperature of 63° C., a temperature and humidity in the chamber of 43° C. and 50% RH, an irradiance of 60 W/m², and a cycle time of water spray (rainfall) of 18 minutes per every 120 minutes.

17. The pressure-sensitive adhesive sheet according to claim 4, wherein a hole diameter of the through-holes at a surface of the base material is smaller than a hole diameter of the through-holes at a pressure-sensitive adhesive face of the pressure-sensitive adhesive layer.

18. The pressure-sensitive adhesive sheet according to claim 16, wherein a hole diameter of the through-holes at a surface of the base material is smaller than a hole diameter of the through-holes at a pressure-sensitive adhesive face of the pressure-sensitive adhesive layer.

\* \* \* \* \*